US012794948B2

(12) United States Patent
Lee et al.

(10) Patent No.: US 12,794,948 B2
(45) Date of Patent: Nov. 10, 2026

(54) SYSTEM AND METHOD FOR POLICY INTELLIGENCE SERVICE PROVISION BASED ON DIGITAL TWIN

(71) Applicant: ELECTRONICS AND TELECOMMUNICATIONS RESEARCH INSTITUTE, Daejeon (KR)

(72) Inventors: Yeonhee Lee, Daejeon (KR); Hyun-Joong Kang, Daejeon (KR); Young Min Kim, Daejeon (KR); Tae Hwan Kim, Daejeon (KR); Hyun-jae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 94 days.

(21) Appl. No.: 18/958,094

(22) Filed: Nov. 25, 2024

(65) Prior Publication Data

US 2026/0122110 A1 Apr. 30, 2026

(30) Foreign Application Priority Data

Oct. 29, 2024 (KR) ........................ 10-2024-0149362

(51) Int. Cl.
*H04L 9/40* (2022.01)
*G06F 21/64* (2013.01)

(52) U.S. Cl.
CPC .............. *H04L 63/20* (2013.01); *G06F 21/64* (2013.01)

(58) Field of Classification Search
CPC ................................. H04L 63/20; G06F 21/64
See application file for complete search history.

(56) References Cited

U.S. PATENT DOCUMENTS

| | | | | |
|---|---|---|---|---|
| 2016/0088018 | A1* | 3/2016 | Kulaga ............... | H04L 41/0853 726/1 |
| 2020/0265329 | A1* | 8/2020 | Thomsen ............... | G06N 20/10 |
| 2021/0273978 | A1* | 9/2021 | Hadar ................... | G06F 21/577 |
| 2022/0237345 | A1* | 7/2022 | Yang ...................... | G05B 23/02 |
| 2022/0261692 | A1 | 8/2022 | Lee et al. | |

(Continued)

FOREIGN PATENT DOCUMENTS

| | | | |
|---|---|---|---|
| KR | 10-2189307 | B1 | 12/2020 |
| KR | 10-2672372 | B1 | 6/2024 |
| KR | 10-2690957 | B1 | 8/2024 |

OTHER PUBLICATIONS

Daniels, Matthew W.; Pierre, Ken; "Integrating Reliability Engineering with Model Based Systems Engineering," Annual Reliability and Maintainability Symposium (RAMS), Jan. 23-26, 2023, Orlando, FL, USA, IEEE, pp. 1-6.*

*Primary Examiner* — Victor Lesniewski
(74) *Attorney, Agent, or Firm* — LRK PATENT LAW FIRM

(57) ABSTRACT

A system and method for high-reliability policy intelligence service provision based on a digital twin is provided. The system for policy intelligence service provision based on a digital twin includes: a reliability management module identifying a response type and a required reliability level for a user's request; a response generation module generating a response corresponding to the response type and the required reliability level; and a response service provision module providing the response to a user.

17 Claims, 12 Drawing Sheets

(56) References Cited

U.S. PATENT DOCUMENTS

| | | | | |
|---|---|---|---|---|
| 2023/0419954 | A1* | 12/2023 | Mittal | G06F 18/214 |
| 2024/0152724 | A1 | 5/2024 | Lee et al. | |
| 2024/0311835 | A1* | 9/2024 | Hirohata | G06Q 20/4016 |
| 2025/0307629 | A1* | 10/2025 | Chakraborty | G06N 3/09 |
| 2025/0335662 | A1* | 10/2025 | Milojicic | G06F 30/27 |
| 2026/0050719 | A1* | 2/2026 | Meisner | G06F 30/27 |
| 2026/0065372 | A1* | 3/2026 | Beejady | G06Q 40/06 |
| 2026/0072430 | A1* | 3/2026 | Hansen | G01M 5/0041 |

* cited by examiner

SYSTEM AND METHOD FOR POLICY INTELLIGENCE SERVICE PROVISION BASED ON DIGITAL TWIN

CROSS-REFERENCE TO RELATED APPLICATION

This application claims priority from and the benefit of Korean Patent Application No. 10-2024-0149362, filed on Oct. 29, 2024, which is hereby incorporated by reference for all purposes as if set forth herein.

BACKGROUND

1. Field of the Invention

The present disclosure relates to a system and method for high-reliability policy intelligence service provision based on a digital twin.

2. Description of Related Art

Since decision-making in government and public policy sectors has a large national impact, there is a need for technologies that support decision-making for a correct decision. There is a demand for artificial intelligence (AI)-based decision-making support technologies that have accuracy and transparency, such as correct determination of economic phenomena in reality, accurate prediction of the future, and suggestion of policy alternatives, but a specific method that may satisfy such a demand has not been presented.

SUMMARY

The present disclosure has been devised to solve the above-described problems, and an object of the present disclosure provides a system and method for high-reliability policy intelligence service provision based on a digital twin capable of enhancing accuracy (reality explanation power) and transparency (model interpretation power).

According to an embodiment of the present disclosure, a system for policy intelligence service provision based on a digital twin includes: a reliability management module identifying a response type and a required reliability level for a user's request; a response generation module generating a response corresponding to the response type and the required reliability level; and a response service provision module providing the response to a user.

The reliability management module may include a request determination unit determining the response type and the required reliability level for the user's request, a response reliability determination unit determining reliability for the generated response, and a model reliability level determination unit determining a reliability satisfaction level for a model used to generate the response.

The system may further include an instance generation module providing information for each time point required to generate the response.

The system may further include an active data collection module collecting data in order to provide the information for each time point.

The system may further include a model optimization module optimizing a model parameter.

According to another embodiment of the present disclosure, a method for policy intelligence service provision based on a digital twin, the method being performed by a system for policy intelligence service provision based on a digital twin, includes: (a) receiving an outlook or analysis service request for a specific time point from a client; (b) determining a response type and response reliability by interpreting the service request received from the client; (c) generating an instance according to the response type and a level of the response reliability; (d) generating a response from the instance according to the level of the response reliability; and (e) providing a response service according to the level of the response reliability to the client.

In step (b), an analysis target time point may be confirmed, and it may be confirmed whether or not a basis for a prediction value needs to be presented and an alternative needs to be presented.

In step (b), the level of the response reliability may be determined by grasping required degrees for reality explanation power of the response and interpretation power of a model.

In step (b), the level of the response reliability may be determined according to an explicit response reliability requirement or be determined according to requester characteristic information or time information of an outlook.

In step (b), when the requester characteristic information is used, an extra point may be given to the reality explanation power or the interpretation power of the model.

In step (c), a report generation model may be learned using a digital twin instance reproduced for each time point and a collected report for each past time point, and a digital twin instance at a target time point may be generated.

In step (d), the response in the form of a report at a specific time point may be generated using the report generation model learned with the digital twin instance at the target time point as an input.

In step (c), a digital twin monitoring instance at a past time point may be generated when the response type is an analysis report for the past time point, a digital instance evolved by one quarter may be generated by executing a simulation when the response type is a next quarter outlook report, and a digital twin instance for each evolutionary quarter may be generated by executing a simulation until a mid- to long-term target time point when the response type is a mid- to long-term outlook report.

According to still another embodiment of the present disclosure, a device for policy intelligence service provision based on a digital twin includes: an input interface device receiving an outlook or analysis service request from a client; a memory in which a program for policy intelligence service provision based on a digital twin is stored; and a processor executing the program, wherein the processor interprets the request received from the client to determine a response type and response reliability and generates a response.

The processor may determine a level of the response reliability by grasping required degrees for reality explanation power of the response and interpretation power of a model.

The processor may give extra points to the reality explanation power and the interpretation power of the model using requester characteristic information.

The processor may generate information for each time point required to generate the response.

The processor may learn a report generation model using a digital twin instance reproduced for each time point and a collected report for each past time point, and generate a digital twin instance at a target time point.

The processor may generate the response in the form of a report at a specific time point using the report generation model learned with the digital twin instance at the target time point as an input.

DETAILED DESCRIPTION

Figure 1:
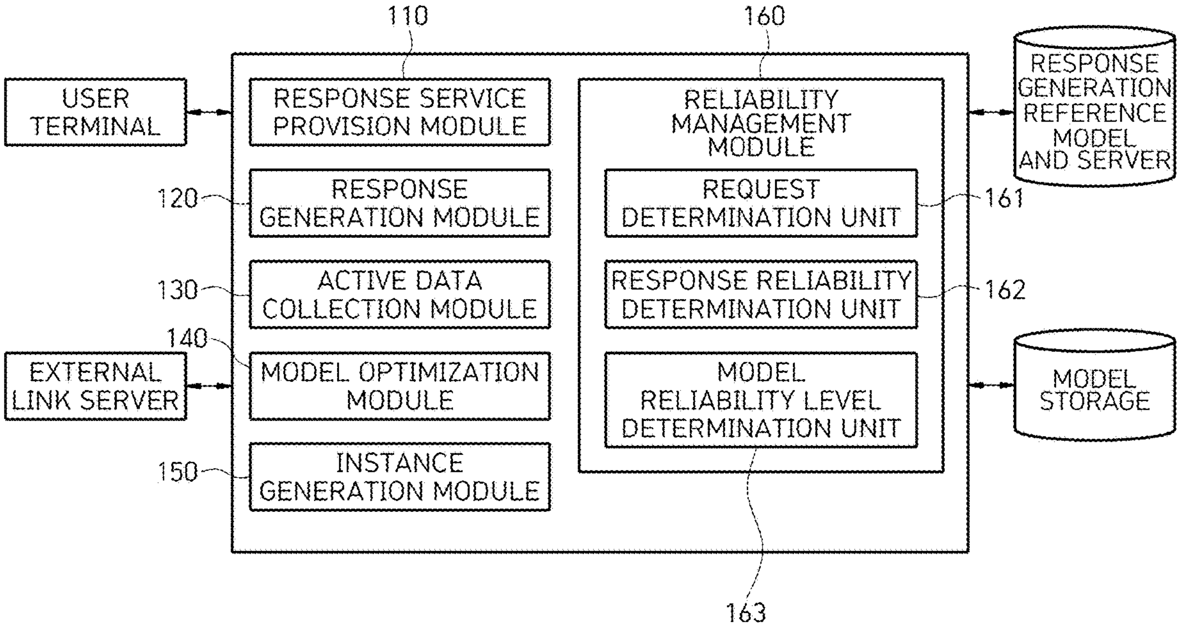
FIG. 1 is a diagram illustrating a system for policy intelligence service provision based on a digital twin according to an embodiment of the present disclosure.

The above-mentioned object, and other aspects, advantages, and features of the present disclosure and methods accomplishing them will become apparent from the following detailed description of embodiments with reference to the accompanying drawings.

However, the present disclosure is not limited to embodiments to be described below, but may be implemented in various different forms, embodiments to be described below will be provided only in order to allow those skilled in the art to which the present disclosure pertains to recognize an object, a configuration, and an effect of the present disclosure, and the scope of the present disclosure will be defined by the claims.

Meanwhile, the terms as used herein are for explaining embodiments rather than limiting the present disclosure. In the present specification, a singular form includes a plural form unless stated otherwise in the phrase. Components, steps, operations, and/or elements mentioned by the terms “comprise” and/or “comprising” as used herein do not exclude the existence or addition of one or more other components, steps, operations, and/or elements.

Hereinafter, the background of the present disclosure will be described in order to help those skilled in the art understand the present disclosure, and embodiments of the present disclosure will be then described.

Since decision-making in government and public policy sectors has a large national impact, there is a need for technologies that support decision-making for a correct decision. There is a demand for artificial intelligence (AI)-based decision-making support technologies that have accuracy and transparency, such as correct determination of economic phenomena in reality, accurate prediction of the future, and suggestion of policy alternatives, but a specific method that may satisfy such a demand has not been presented.

According to the related art, in many cases, a traditional statistical model, a time series prediction model, and a low-resolution simulation-based model have been utilized, and accordingly, deterioration of reality explanation power such as calculation of results far from reality has been caused. When a model having a large number of parameters is trained from various datasets such as deep learning, a relatively complex data pattern may be learned and high prediction performance may be obtained, but there is a problem that an internal structure of the model is complex, transparency of the model is low, and interpretation power of the model is low.

A statistical model according to the related art is based on clear mathematical formulas and assumptions, and thus may clearly explain roles of and a relationship between respective variables, but has a limitation that it is difficult to completely explain a complex problem of reality.

A latest time series prediction model such as a long short-term memory (LSTM), a convolution neural network (CNN), and a generative time series model may consider various input factors and express a nonlinear pattern compared to the statistical model, and thus, has relatively high explanation power for reality. On the other hand, the latest time series prediction model has a problem that a lot of data are required in model learning, accuracy is significantly reduced in a rapidly changing environment due to high dependence on a past pattern, and explanation power of the model itself is low.

A digital twin includes a monitoring and simulation-based analysis tool to make an evidence-based policy through synchronization with the real world through big data. The digital twin may be mounted with various levels of simulation models depending on resolution, and in simulation-based prediction of the digital twin, the more precise the resolution of the modeling, the more sophisticated the policy experiment may be in an environment similar to reality. In addition, the digital twin may be utilized as a tool that may precisely explain a basis for a policy result. However, in the case of simulation prediction, there is a problem that a macroscopic error explodes even in slight abnormal data or a slight modeling error and there is a problem that interpretation power of the model is low.

FIG. 1 is a diagram illustrating a system for policy intelligence service provision based on a digital twin according to an embodiment of the present disclosure.

The system for policy intelligence service provision based on a digital twin according to an embodiment of the present disclosure includes a reliability management module 160, a response generation module 120, an instance generation module 150, and a response service provision module 110.

The reliability management module 160 identifies a response type and a required reliability level for a user's request, and determines reliability levels for a model and a response. The reliability management module 160 includes a request determination unit 161 determining the response type and the required reliability level for the user's request, a response reliability determination unit 162 determining reliability for a generated response, and a model reliability level determination unit 163 determining a reliability satisfaction level for the model used to generate the response.

The response generation module 120 generates a response corresponding to the response type and the required reliability level. The instance generation module 150 provides information for each time point required for the response generation module 120 to generate the response. The response service provision module 110 provides a response service to a user.

The system for policy intelligence service provision based on a digital twin according to an embodiment of the present disclosure includes an active data collection module 130 and a model optimization module 140.

The active data collection module 130 automatically collects data through an external link server for each predetermined collection cycle using data collection information in order to provide accurate information for each time point.

The model optimization module 140 optimizes a model parameter so as to fit the data.

Figure 2:
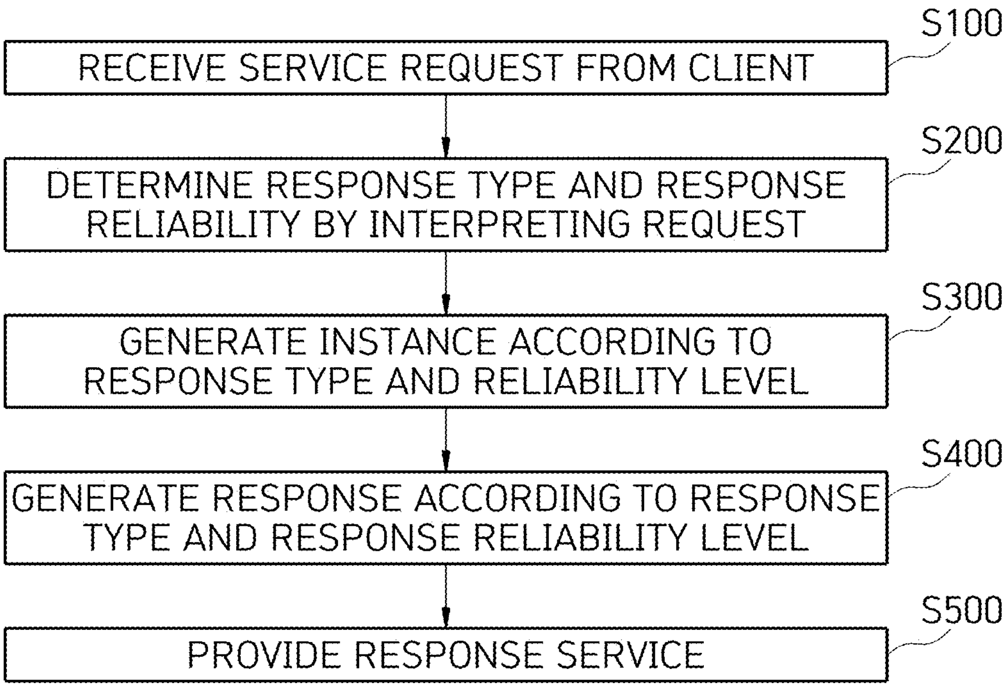
FIG. 2 is a diagram illustrating a method for policy intelligence service provision based on a digital twin according to an embodiment of the present disclosure.

FIG. 2 illustrates a method for policy intelligence service provision based on a digital twin according to an embodiment of the present disclosure.

In S100, an outlook or analysis service request for a specific time point is received from a client.

In S200, a response type and response reliability are determined by interpreting the service request received from the client.

In S300, an instance is generated according to the response type and a response reliability level.

In S400, a response is generated from the instance according to the response reliability level.

In S500, a response service according to the response reliability level is provided to the client.

Figure 3:
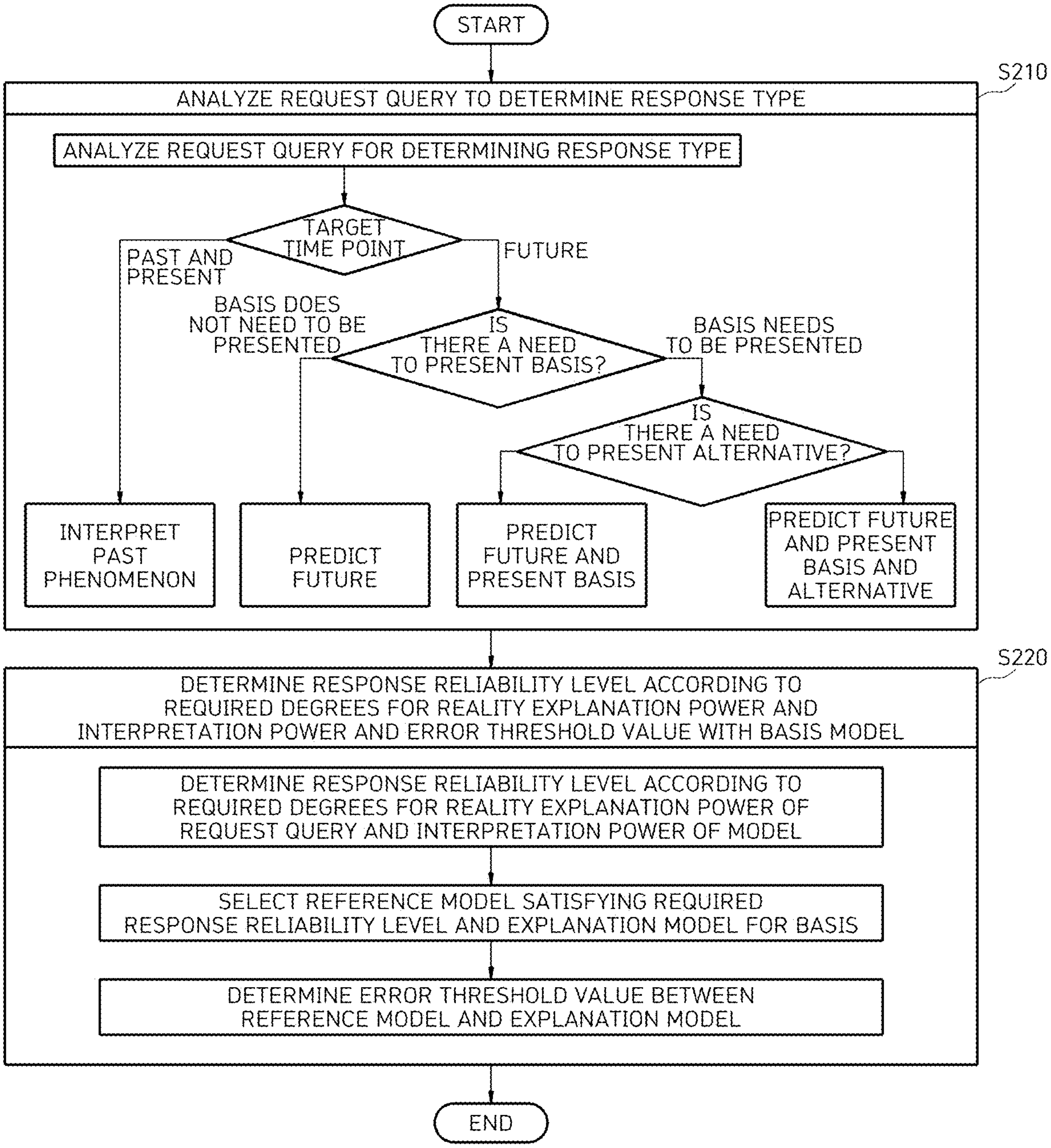
FIG. 3 is a diagram illustrating a process of determining a response type and a response reliability level of a request determination unit according to an embodiment of the present disclosure.

FIG. 3 illustrates a process of determining a response type and a response reliability level of a request determination unit according to an embodiment of the present disclosure.

According to an embodiment of the present disclosure, the process of determining a response type and a response reliability level includes a process of analyzing a user's request query to determine a response type (S210), and a process of determining a response reliability level and an error threshold value with a model for presenting a basis by grasping required degrees for reality explanation power of a response and interpretability of the model (S220).

Process of analyzing user's request query to determine response type (S210)

Referring to FIG. 3, the request query for determining the response type is analyzed, and a target time point to be analyzed is determined.

When the target time point to be analyzed is the past or present, a past phenomenon is interpreted.

When the target time point to be analyzed is the future, it is confirmed whether or not a basis for a prediction value needs to be presented.

When the basis does not need to be presented, a future prediction is performed.

When it is confirmed that the basis needs to be presented, it is confirmed whether or not an alternative needs to be presented. Depending on a determination result, a future prediction and the presentation of the basis are performed or a future prediction, the presentation of the basis, and the presentation of the alternative are performed.

Process of determining response reliability level and error threshold value with model for presenting basis by grasping required degrees for reality explanation power of response and interpretability of model (S220)

Referring to FIG. 3, the response reliability level is determined according to required degrees for reality explanation power of the request query and interpretation power of the model. In this case, in order to determine the response reliability level, the response reliability level may be determined according to an explicit response reliability requirement transferred as the request query. As another example, the response reliability level may be determined by analyzing a context of the request query. As still another example, the response reliability level may be determined by utilizing requester characteristic information (e.g., an economic analyst, an economic outlook person, a fiscal policy maker, etc.), time information of an outlook (e.g., a past phenomenon analysis, a short-term outlook, a mid- to long-term outlook, etc.), and the like.

According to an embodiment of the present disclosure, a reference model satisfying a required response reliability level and an explanation model for a basis are selected. In this case, the reference model satisfying the required response reliability level and the explanation model are selected using a result of identifying reliability level information of the model, that is, reality explanation power and model interpretation power, in advance, through the model reliability level determination unit 163.

As an example, when a requester is an economic analyst, the required response reliability level is set by giving an extra point to the model interpretation power, a statistical model with high model interpretation power or a traditional time series model is selected as the reference model, and a simulation model is set as the explanation model for the basis. As another example, when a requester is a data analyst, a fiscal policymaker determining a short-term policy, or a policy maker, the required response reliability level is set by giving an extra point to the reality explanation power, and a high-resolution simulation model or a deep learning model learning a pattern with input variables and a large number of parameters is used as the reference model.

In addition, an error threshold value between the reference model and the explanation model is set.

Figure 4:
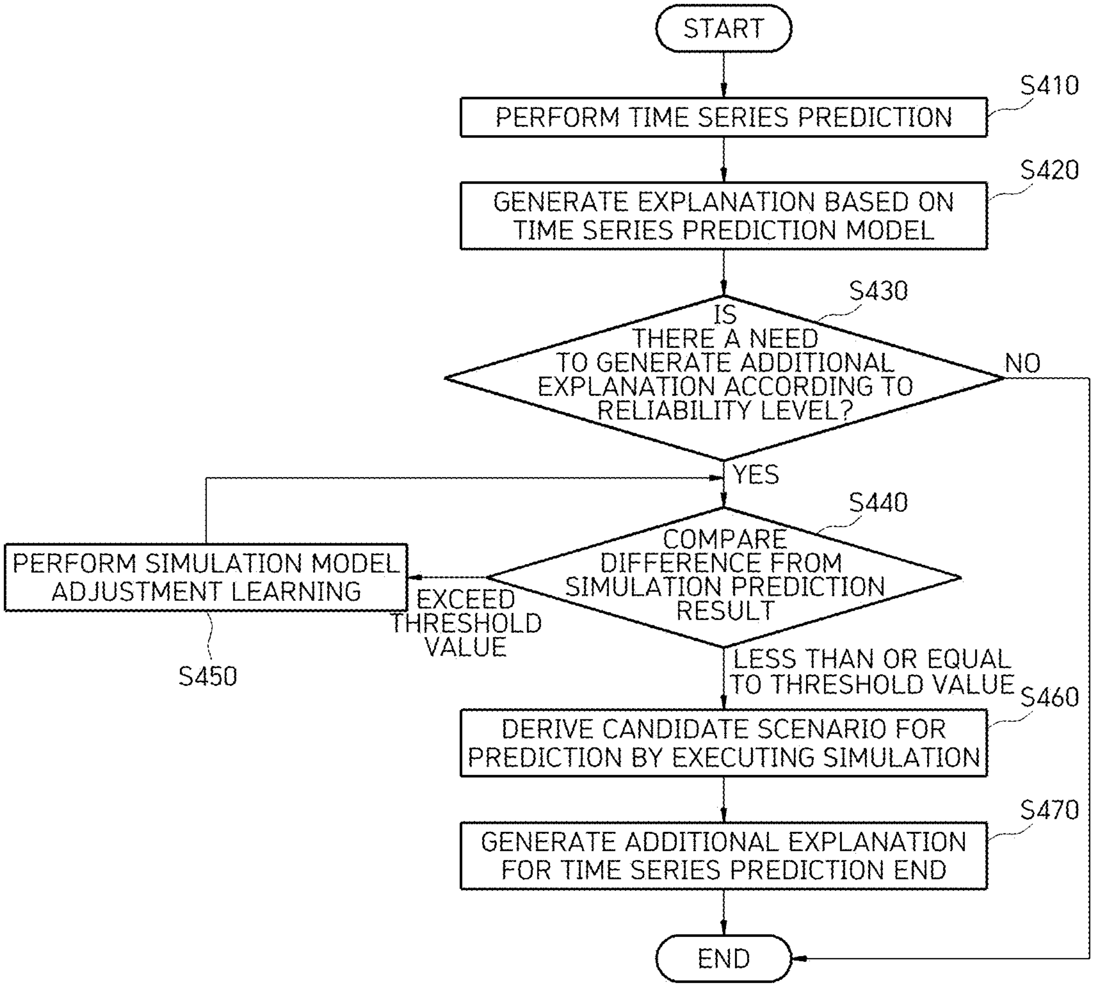
FIG. 4 is a diagram illustrating a process of generating a response according to the response type and the response reliability level according to an embodiment of the present disclosure.

FIG. 4 illustrates a process of generating a response according to the response type and the response reliability level according to an embodiment of the present disclosure.

A process of generating a response to an economic outlook request in which a time series prediction model is set as a reference model and a simulation model is set as an explanation model generating an explanation that becomes a basis will be described as an example of response generation according to the response type and the response reliability level with reference to FIG. 4.

In S410, a prediction is performed using a time series prediction model for an economic outlook, and an outlook value is obtained.

In S420, an explanation is generated using the time series prediction model. In this case, the explanation is generated using accuracy information on the outlook and contribution value information for each input contributing to the outlook.

In S430, it is determined whether or not an explanation for presenting a basis for the outlook needs to be generated according to a reliability level of the outlook.

When it is determined that the basis for the outlook needs to be presented, a difference between a simulation prediction result and a time series prediction result is compared in order to verify consistency between the simulation prediction result and the time series prediction result in S440.

When the difference exceeds a predetermined threshold value, readjustment learning of the simulation model is performed so that a prediction value using the simulation model becomes similar to a prediction value using the time series prediction model in S450.

When the difference is less than or equal to the predetermined threshold value, a candidate scenario for the prediction is derived by executing a simulation in S460.

In S470, an additional explanation for a time series prediction is generated from the derived candidate scenario.

Figure 5:
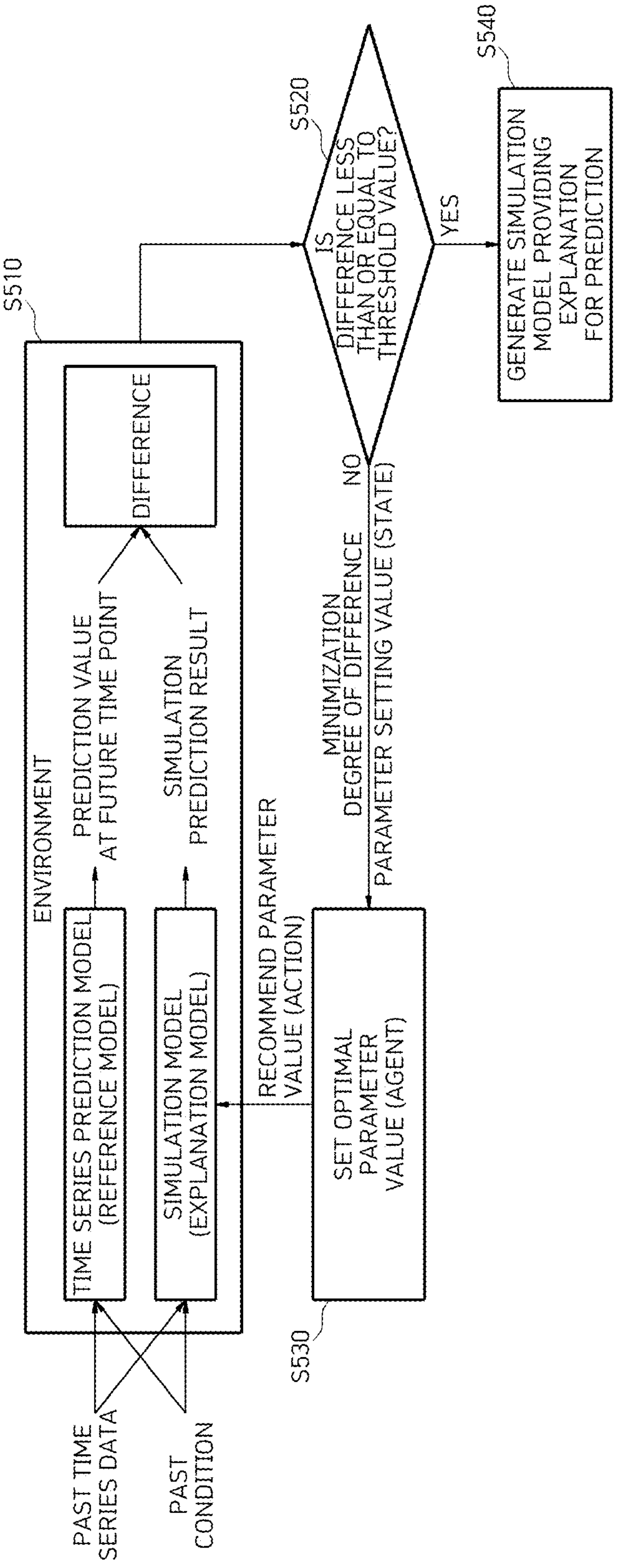
FIG. 5 is a diagram illustrating a process of optimizing a reinforcement learning-based simulation model for deriving a basis scenario for an inference result using a prediction model as a reference model according to an embodiment of the present disclosure.

FIG. 5 illustrates a process of optimizing a reinforcement learning-based simulation model for deriving a basis scenario for an inference result using a prediction model as a reference model according to an embodiment of the present disclosure.

A readjustment learning process (S450) of the simulation model described in FIG. 4 will be described in detail with reference to FIG. 5.

According to an embodiment of the present disclosure, the time series prediction model becomes a reference model, the simulation model becomes a basis explanation model, and reinforcement learning-based simulation model optimization for deriving a basis scenario for a prediction is performed.

In S510, past time series data and condition data are used as input data, a prediction for a future time point is performed using the time series prediction model (reference model) and the simulation model (basis explanation model), and a difference between a prediction value at the future time point (an output of the time series prediction model) and a simulation prediction result (an output of the simulation model) is obtained.

In S520, it is determined whether or not the difference is less than or equal to a threshold value, and a minimization degree of the difference is transferred as a compensation value and a current parameter setting value of the simulation model is transferred as a state value, when the difference exceeds the threshold value.

In S530, an optimal parameter value is searched by searching for a parameter value of the simulation model minimizing the transferred compensation value, and the simulation model is reset with an optimal parameter adjustment value (action: parameter value recommendation).

The above-described process is repeatedly performed using the existing prediction model and the reset simulation model.

When the difference between the two prediction results is less than or equal to the threshold value as a determination result in S520, the simulation model that has been adjusted up to date is selected as a simulation model providing a basis and an explanation for the prediction in S540.

Figure 6:
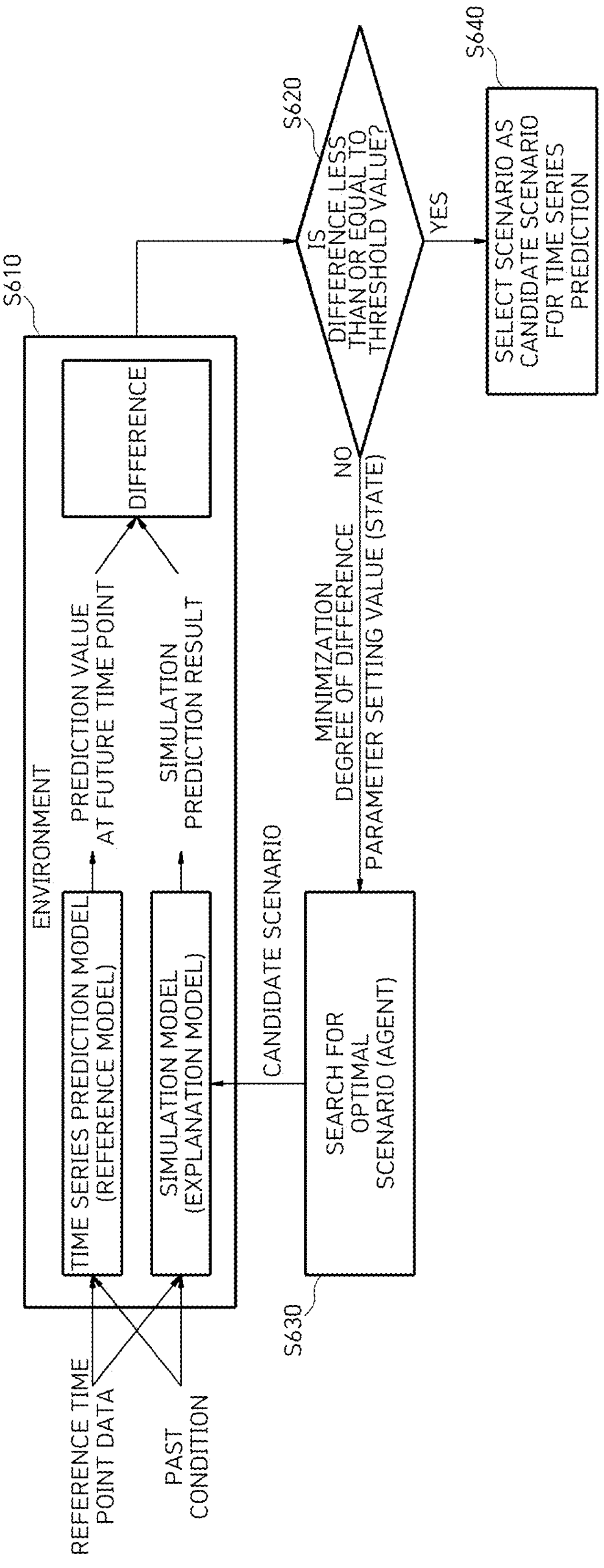
FIG. 6 is a diagram illustrating a process of deriving a basis scenario based on reinforcement learning and a simulation model for generating an explanation for a specific time point according to an embodiment of the present disclosure.

FIG. 6 illustrates a process of deriving a basis scenario based on reinforcement learning and a simulation model for generating an explanation for a specific time point according to an embodiment of the present disclosure.

The process (S460) of deriving a candidate basis scenario by executing the simulation described with reference to FIG. 4 will be described in detail with reference to FIG. 6.

According to an embodiment of the present disclosure, the time series prediction model is set as the reference model, the simulation model is set as the basis explanation model, and candidate basis scenario derivation using reinforcement learning is performed.

In S610, time series data or condition data is input to the reference model in order to predict a specific reference prediction time point. In addition, a policy corresponding to a candidate scenario is input to the simulation model. In S610, a difference between prediction data that becomes an output of the reference model and a simulation prediction result that becomes an output of the explanation model is obtained.

In S620, it is determined whether the difference is lower than or equal to a threshold value that may be used as a basis for a simulation result.

When it is determined in S620 that the difference exceeds the threshold value that becomes a reference, a degree of minimizing a difference from a prediction using the reference model and a current parameter setting value are transferred as a compensation value and a state value, respectively, and a candidate scenario that minimizes the compensation value is derived in S630. The derived candidate scenario is used as input data for performing a simulation together with reference time point data, and an optimal candidate scenario is derived through repetition of the above-described process.

When it is determined in S620 that the difference between the two prediction results is less than or equal to the threshold value, a corresponding scenario is selected as a candidate scenario that provides a basis for a prediction by the time series prediction model (reference model) in S640.

Figure 7:
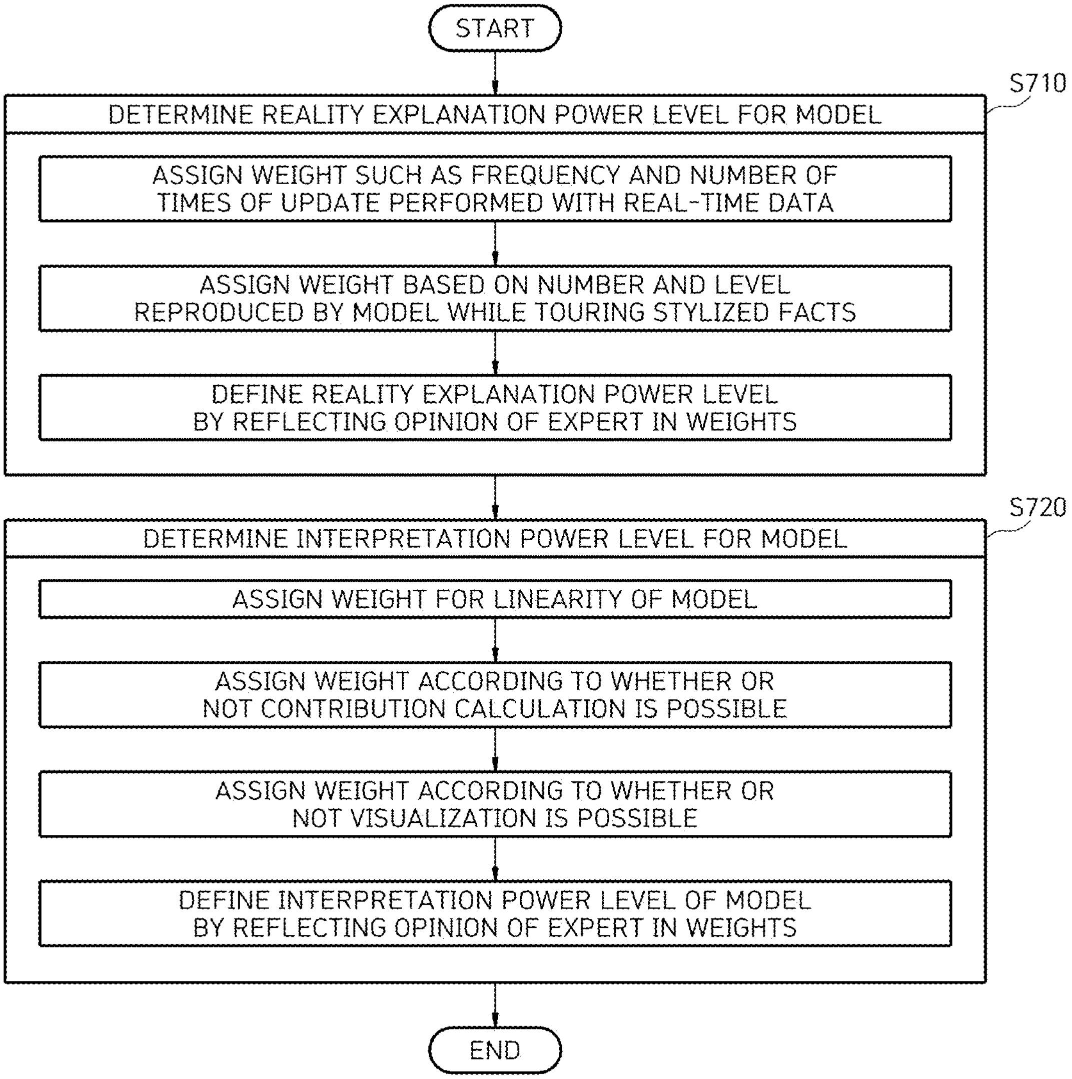
FIG. 7 is a diagram illustrating a process of determining a reliability level for a model according to an embodiment of the present disclosure.

FIG. 7 illustrates a process of determining a reliability level for a model according to an embodiment of the present disclosure.

A reality explanation power level for the model is determined in S710, and an interpretation power level for the model is determined in S720.

The process (S710) of determining the reality explanation power level for the model includes assigning a weight such as the frequency and the number of times of an update performed with real-time data, assigning a weight based on the number and a level reproduced by the model while touring stylized facts, and defining the reality explanation power level by reflecting an opinion of an expert in the weights.

The process (S720) of determining the interpretation power level for the model includes assigning a weight for linearity of the model, assigning a weight according to whether or not contribution calculation is possible, assigning a weight according to whether or not visualization of a result and a process is possible, and defining the interpretation power level of the model by reflecting an opinion of an expert in the weights.

Figure 8:
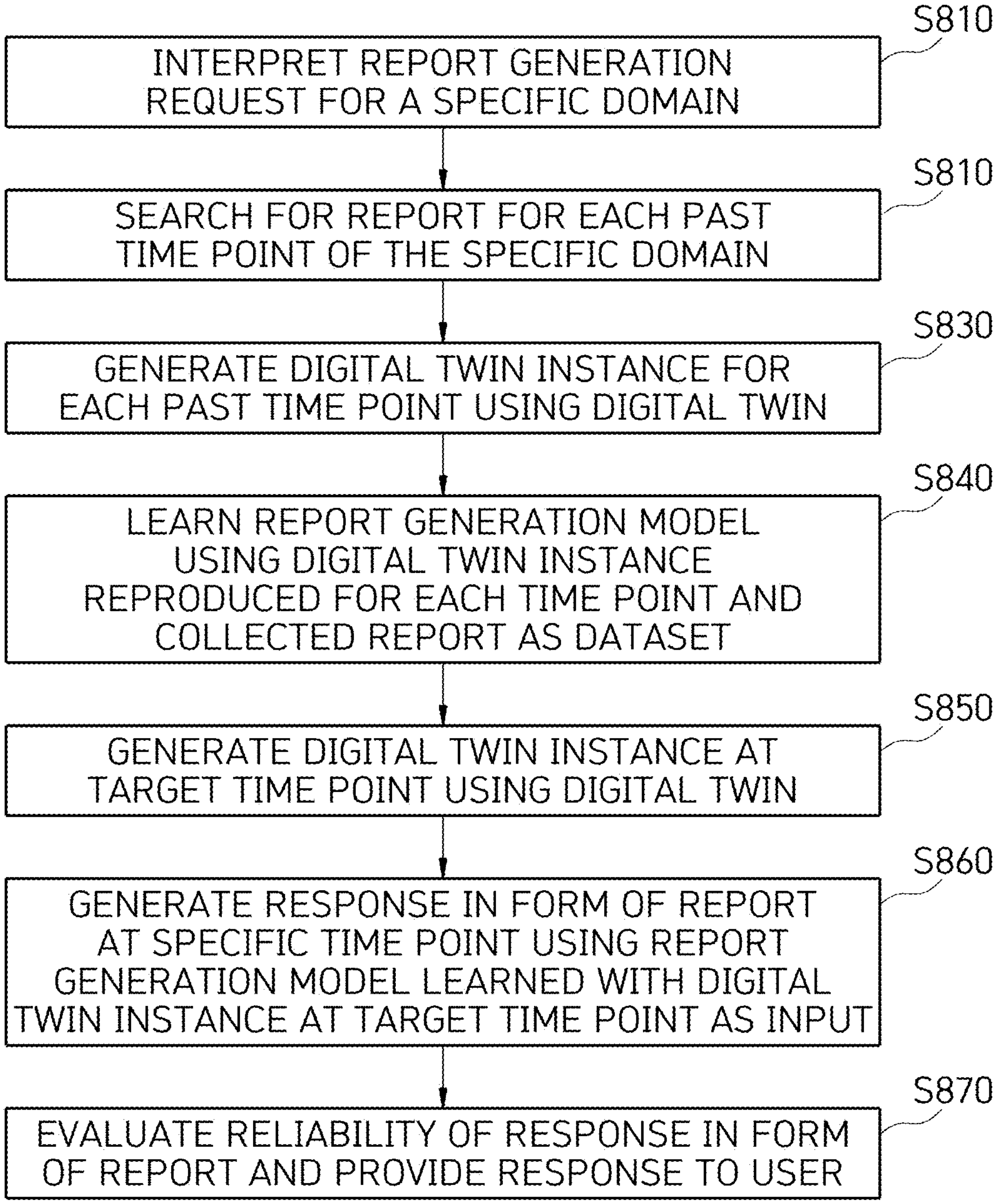
FIG. 8 is a diagram illustrating a procedure of generating a response in the form of a report based on a digital twin according to an embodiment of the present disclosure.

FIG. 8 illustrates a procedure of generating a response in the form of a report based on a digital twin according to an embodiment of the present disclosure.

In S810, an interpretation for a report generation request for a specific domain is performed.

In S820, a report for each past time point of the specific domain is searched.

In S830, a digital twin instance for each past time point is generated using a digital twin.

In S840, a report generation model is learned using the digital twin instance reproduced for each time point and the collected report as a dataset.

In S850, a digital twin instance at a target time point when a report is to be generated is generated using a digital twin.

In S860, a response in the form of a report at a specific time point is generated using a report generation model learned with the digital twin instance at the target time point as an input.

In S870, reliability of the generated response in the form of the report is evaluated, and a response is provided to a user.

Figure 9:
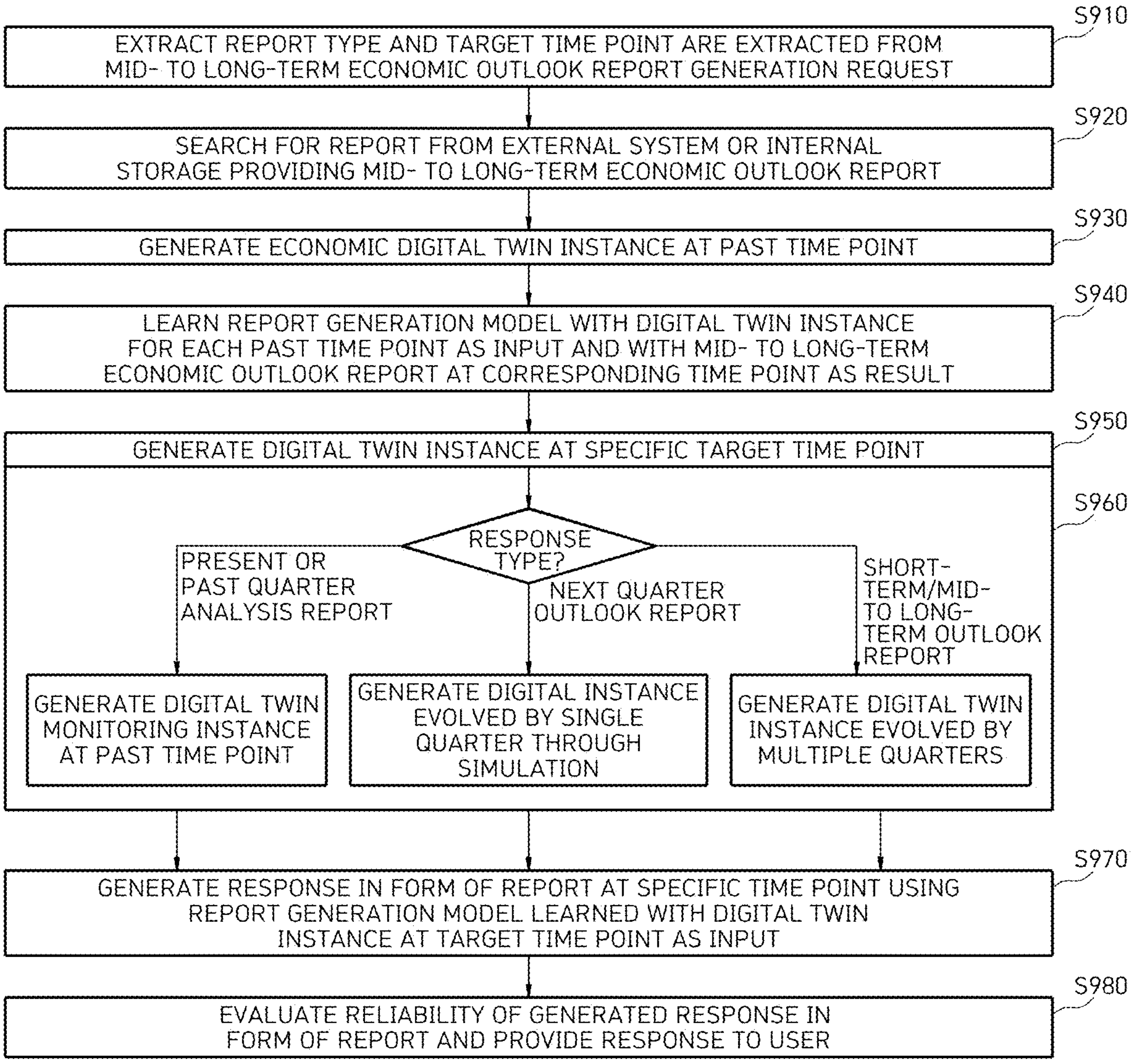
FIG. 9 is a diagram illustrating a process of generating a response based on a digital twin for a mid- and long-term economic outlook report generation request according to an embodiment of the present disclosure.

FIG. 9 illustrates a process of generating a response based on a digital twin for a mid- and long-term economic outlook report generation request according to an embodiment of the present disclosure.

In S910, a response type and a target time point are extracted from the mid- to long-term economic outlook report generation request.

In S920, a report is searched from an external system or an internal storage providing a mid- to long-term economic outlook report.

In S930, an economic digital twin instance for each past time point is generated.

In S940, a report generation model with the digital twin instance for each past time point as an input and with a mid- to long-term economic outlook report at a corresponding time point as a result is learned.

In S950, a digital twin instance at a specific target time point is generated.

In S960, a response type is determined. A digital twin monitoring instance at a past time point is generated when the response type is an analysis report for the past time point, a digital instance evolved by one quarter is generated by executing a simulation when the response type is a next quarter outlook report, and a digital twin instance for each evolutionary quarter is generated by executing a simulation until a mid- to long-term target time point when the response type is a mid- to long-term outlook report.

In S970, a response in the form of a report at a specific time point is generated using a report generation model learned with the digital twin instance at the target time point as an input.

In S980, reliability of the generated response in the form of the report is evaluated, and a response is provided to a user.

Figure 10:
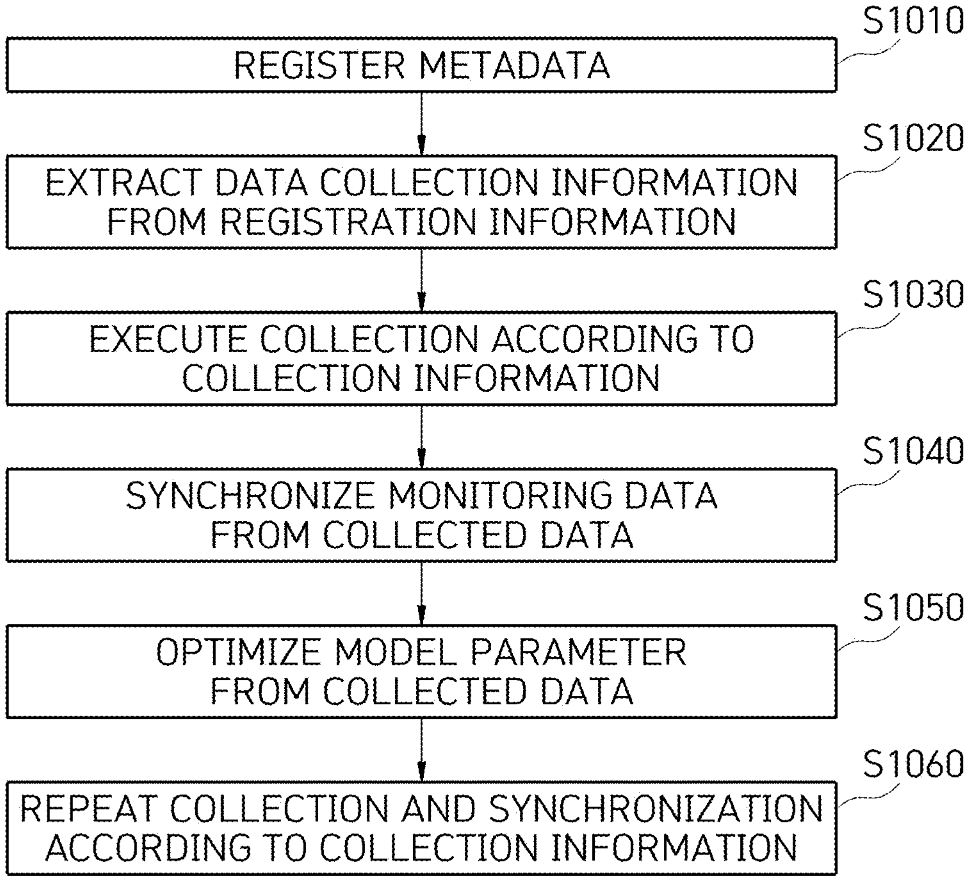
FIG. 10 is a diagram illustrating an active digital twin improvement process according to an embodiment of the present disclosure.

FIG. 10 illustrates an active digital twin improvement process according to an embodiment of the present disclosure.

In S1010, metadata for data collection composed of a collection source, a collection method, a collection cycle, collection contents, an access method, and the like, are registered.

In S1020, data collection information for each time point is extracted from registration information.

In S1030, collection is executed according to the collection information for each time point.

In S1040, data on a monitoring instance is updated using the data collected for each time point.

In S1050, a parameter of a model is optimized to maintain the latest model performance for a specific time point using the data collected for each time point.

In S1060, collection and synchronization are repeated according to the collection information.

Figure 11:
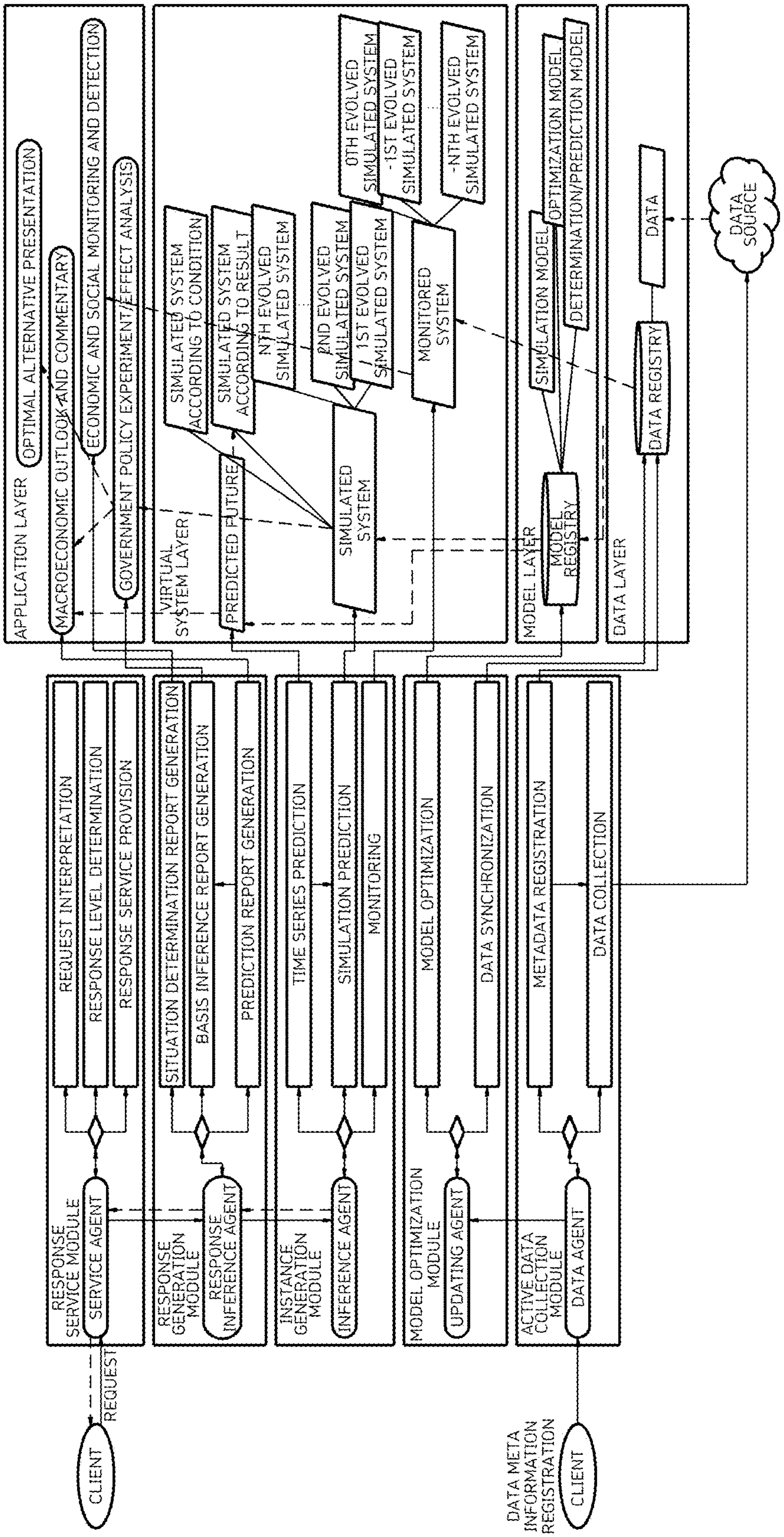
FIG. 11 is a diagram an active service device based on a digital twin according to an embodiment of the present disclosure.

FIG. 11 illustrates an active service device based on a digital twin according to an embodiment of the present disclosure.

According to an embodiment of the present disclosure, a service agent (included in a response service module) receives a request from a client, interprets the request, determines a reliability level of a response, and requests a response inference agent (included in a response generation module) to generate the response in order to provide a response service.

The response inference agent requests an inference agent (included in an instance generation module) to generate a digital twin instance for each time point required for generating the response.

The inference agent performs time series prediction, simulation prediction, and monitoring instance generation using a time series prediction model and simulation models.

The response inference agent additionally generates a report on past or present situation determination and a report on future prediction according to a type of response request and a present situation or a basis for a prediction according to a reliability level of each response type, with reference to system instances generated according to a response type.

The service agent provides the response generated by the inference agent to the client.

Figure 12:
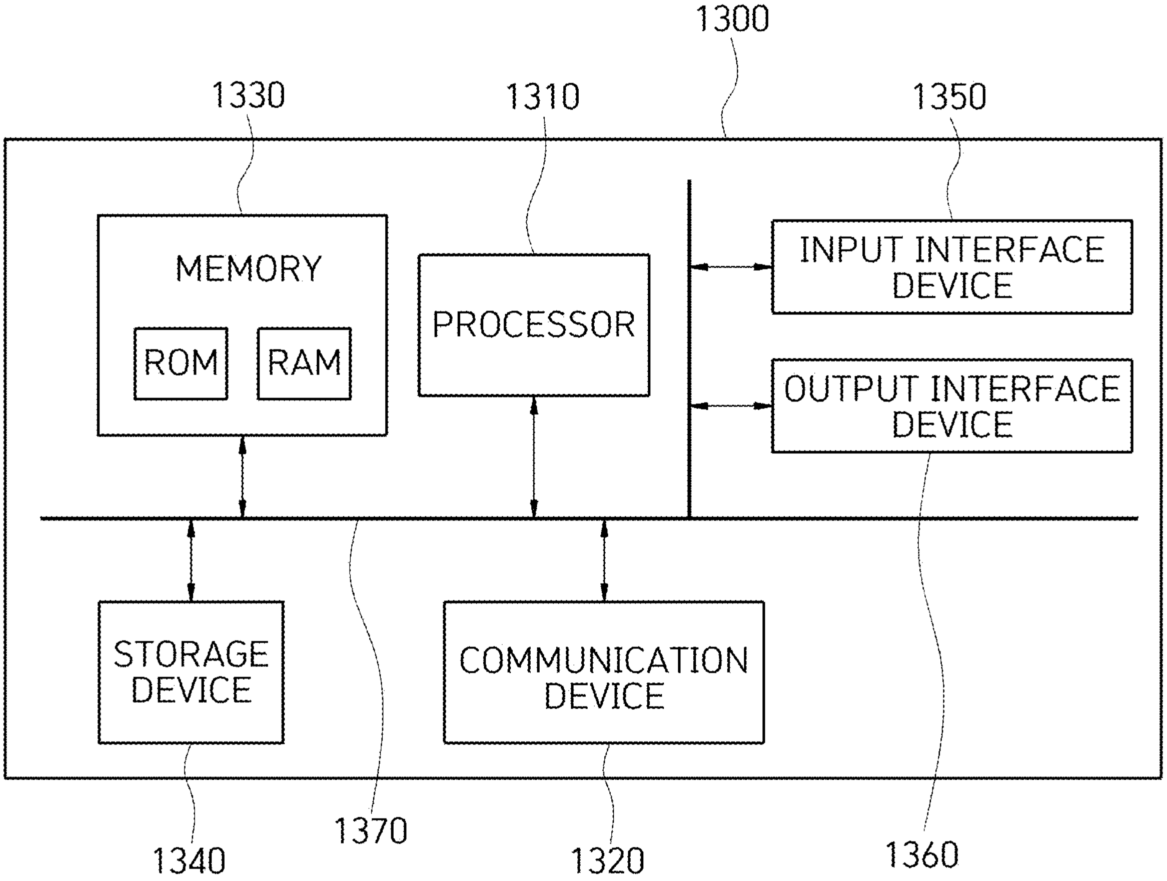
FIG. 12 is a block diagram illustrating a computer system for implementing a method according to an embodiment of the present disclosure.

FIG. 12 is a block diagram illustrating a computer system for implementing a method according to an embodiment of the present disclosure.

Referring to FIG. 12, the computer system 1300 may include at least one of a processor 1310, a memory 1330, an input interface device 1350, an output interface device 1360, and a storage device 1340 that communicate with each other through a bus 1370. The computer system 1300 may also include a communication device 1320 coupled to a network. The processor 1310 may be a central processing unit (CPU) or be a semiconductor device executing an instruction stored in the memory 1330 or the storage device 1340. The memory 1330 and the storage device 1340 may include various types of volatile or nonvolatile storage media. For example, the memory may include a read only memory (ROM) and a random access memory (RAM). In an embodiment of the present disclosure, the memory may be positioned inside or outside the processor, and may be connected to the processor through various means that have been already known. The memory may be various types of volatile or nonvolatile storage media, and may include, for example, a read only memory (ROM) or a random access memory (RAM).

A device for policy intelligence service provision based on a digital twin according to an embodiment of the present disclosure includes the input interface device 1350 receiving an outlook or analysis service request from a client, the memory 1330 in which a program for policy intelligence service provision based on a digital twin is stored, and the processor 1310 executing the program, wherein the processor 1310 interprets the request received from the client to determine a response type and response reliability and generates a response.

The processor 1310 determines a level of response reliability by grasping required degrees for reality explanation power of the response and interpretation power of a model.

The processor 1310 gives extra points to the reality explanation power and the interpretation power of the model using uses requester characteristic information.

The processor 1310 generates information for each time point required to generate the response.

The processor 1310 learns a report generation model using a digital twin instance reproduced for each time point and a collected report for each past time point, and generates a digital twin instance at a target time point.

The processor 1310 generates a response in the form of a report at a specific time point using the report generation model learned with the digital twin instance at the target time point as an input.

Accordingly, an embodiment of the present disclosure may be implemented as a method implemented on a computer or be implemented as a non-transitory computer-readable medium in which a computer-executable instruction is stored. In an embodiment, a computer-readable instruction may perform a method according to at least one aspect of the present disclosure when it is executed by the processor.

The communication device 1320 may transmit or receive a wired signal or a wireless signal.

In addition, a method according to an embodiment of the present disclosure may be implemented in a form of a program instruction that may be executed through various computer means, and may be recorded in a computer-readable recording medium.

The computer-readable recording medium may include a program instruction, a data file, a data structure, or the like, alone or a combination thereof. The program instruction recorded in the computer-readable recording medium may be specially designed and constituted for an embodiment of the present disclosure or be known to and usable by those skilled in a computer software field. The computer-readable recording medium may include a hardware device configured to store and execute the program instruction. For example, the computer-readable recording medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a ROM, a RAM, a flash memory, or the like. The program instruction may include not only a machine language code generated by a compiler, but also a high-level language code that may be executed by a computer through an interpreter or the like.

According to the present disclosure, it is possible to provide an adaptive artificial intelligence service according to a user's request type and a reliability level of a response.

According to the present disclosure, it is possible to provide a reliable policy intelligence service to a user (including a simple user and an important policy decision maker) who requires various reliability levels.

The effects of the present disclosure are not limited to the above-described effects, and other effects that are not mentioned may be obviously understood by those skilled in the art from the following description.

Although embodiments of the present disclosure have been described in detail hereinabove, the scope of the present disclosure is not limited thereto, and may include several modifications and alterations made by those skilled in the art using a basic concept of the present disclosure as defined in the claims.

What is claimed is:

1. A system for policy intelligence service provision based on a digital twin, comprising:

a reliability management module identifying a response type and a required reliability level for a user's request;

a response generation module generating a response corresponding to the response type and the required reliability level; and a response service provision module providing the response to a user, wherein the system further comprises a memory in which a program for policy intelligence service provision based on a digital twin is stored, and a processor executing the program, and the reliability management module, the response generation module, and the response service provision module are implemented by the processor executing the program, and wherein the reliability management module further selects, based on the required reliability level, a reference model satisfying the required reliability level and an explanation model for a basis of the response, wherein when the required reliability level is set by giving an extra point to interpretation power of a model using requester characteristic information, a statistical model with high model interpretation power or a traditional time series model is selected as the reference model and a simulation model is set as the explanation model, and when the required reliability level is set by giving an extra point to reality explanation power of the response using the requester characteristic information, a high-resolution simulation model or a deep learning model learning a pattern with input variables and a large number of parameters is selected as the reference model.

2. The system of claim 1, wherein the reliability management module includes a request determination unit determining the response type and the required reliability level for the user's request, a response reliability determination unit determining reliability for the generated response, and a model reliability level determination unit determining a reliability satisfaction level for a model used to generate the response.

3. The system of claim 1, further including an instance generation module providing information for each time point required to generate the response.

4. The system of claim 3, further comprising an active data collection module collecting data in order to provide the information for each time point.

5. The system of claim 1, further comprising a model optimization module optimizing a model parameter.

6. A method for policy intelligence service provision based on a digital twin, the method being performed by a system for policy intelligence service provision based on a digital twin, the method comprising:

(a) receiving an outlook or analysis service request for a specific time point from a client;

(b) determining a response type and response reliability by interpreting the service request received from the client;

(c) generating an instance according to the response type and a level of the response reliability;

(d) generating a response from the instance according to the level of the response reliability;

(e) providing a response service according to the level of the response reliability to the client; and (f) selecting, based on the level of the response reliability, a reference model satisfying the level of the response reliability and an explanation model for a basis of the response, wherein when the level of the response reliability is set by giving an extra point to interpretation power of a model using requester characteristic information, a statistical model with high model interpretation power or a traditional time series model is selected as the reference model and a simulation model is set as the explanation model, and when the level of the response reliability is set by giving an extra point to reality explanation power of the response using the requester characteristic information, a high-resolution simulation model or a deep learning model learning a pattern with input variables and a large number of parameters is selected as the reference model.

7. The method of claim 6, wherein in step (b), an analysis target time point is confirmed, and it is confirmed whether or not a basis for a prediction value needs to be presented and an alternative needs to be presented.

8. The method of claim 6, wherein in step (b), the level of the response reliability is determined by grasping required degrees for the reality explanation power of the response and interpretation power of a model.

9. The method of claim 8, wherein in step (b), the level of the response reliability is determined according to an explicit response reliability requirement or is determined according to the requester characteristic information or time information of an outlook.

10. The method of claim 6, wherein in step (c), a report generation model is learned using a digital twin instance reproduced for each time point and a collected report for each past time point, and a digital twin instance at a target time point is generated.

11. The method of claim 10, wherein in step (d), the response in the form of a report at a specific time point is generated using the report generation model learned with the digital twin instance at the target time point as an input.

12. The method of claim 10, wherein in step (c), a digital twin monitoring instance at a past time point is generated when the response type is an analysis report for the past time point, a digital instance evolved by one quarter is generated by executing a simulation when the response type is a next quarter outlook report, and a digital twin instance for each evolutionary quarter is generated by executing a simulation until a mid- to long-term target time point when the response type is a mid- to long-term outlook report.

13. A device for policy intelligence service provision based on a digital twin, comprising:

an input interface device receiving an outlook or analysis service request from a client;

a memory in which a program for policy intelligence service provision based on a digital twin is stored; and a processor executing the program, wherein the processor interprets the request received from the client to determine a response type and response reliability and generates a response, wherein the processor further selects, based on the response reliability, a reference model satisfying the response reliability and an explanation model for a basis of the response, wherein when the response reliability is set by giving an extra point to interpretation power of a model using requester characteristic information, a statistical model with high model interpretation power or a traditional time series model is selected as the reference model and a simulation model is set as the explanation model, and when the response reliability is set by giving an extra point to reality explanation power of the response using the requester characteristic information, a high-resolution simulation model or a deep learning model learning a pattern with input variables and a large number of parameters is selected as the reference model.

14. The device of claim 13, wherein the processor determines a level of the response reliability by grasping required degrees for the reality explanation power of the response and the interpretation power of a model.

15. The device of claim 13, wherein the processor generates information for each time point required to generate the response.

16. The device of claim 15, wherein the processor learns a report generation model using a digital twin instance reproduced for each time point and a collected report for each past time point, and generates a digital twin instance at a target time point.

17. The device of claim 16, wherein the processor generates the response in the form of a report at a specific time point using the report generation model learned with the digital twin instance at the target time point as an input.

* * * * *